Figure 1:
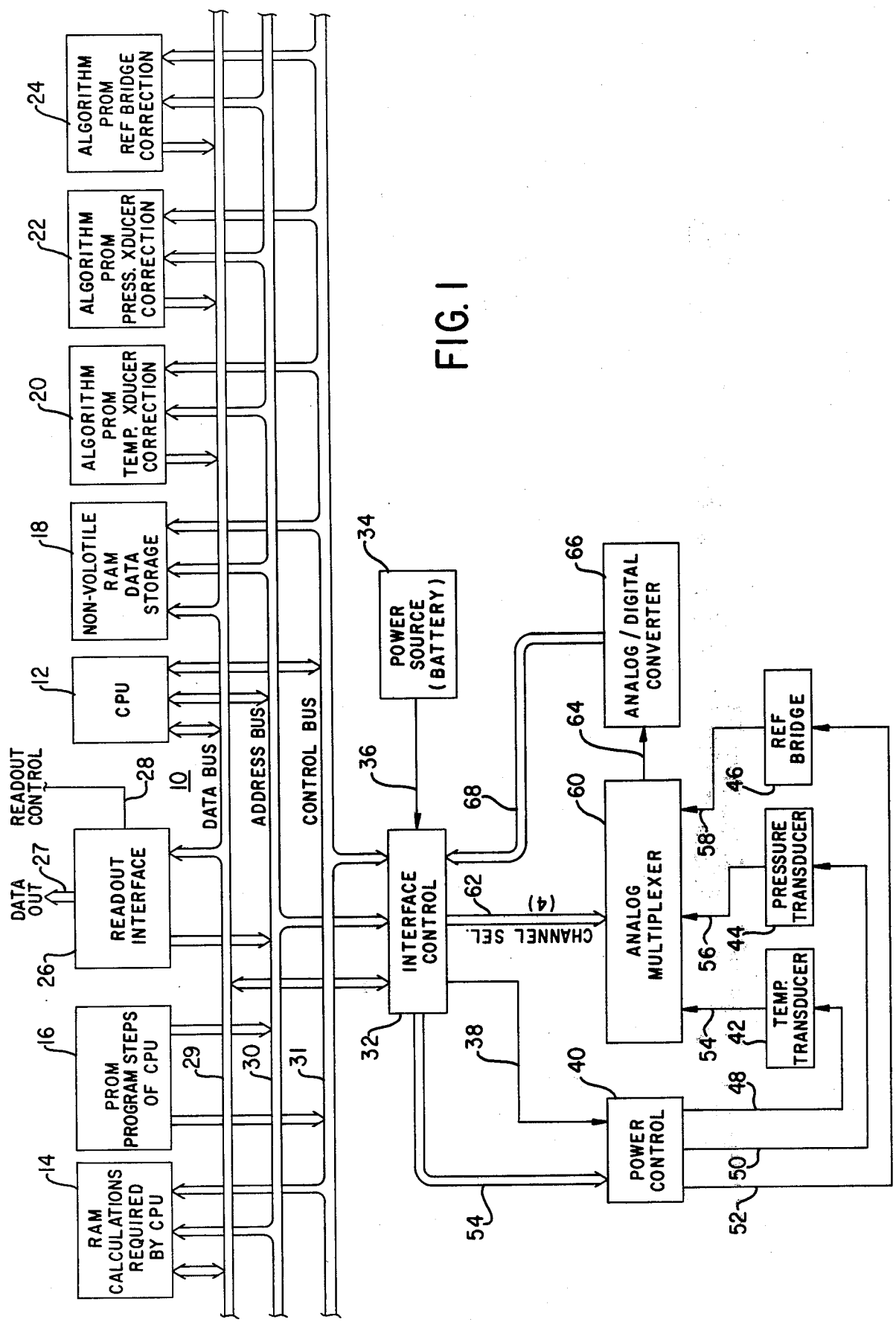

United States Patent [19]

McCracken

[11] 4,161,782

[45] Jul. 17, 1979

[54] MICROPROCESSOR COMPUTERIZED PRESSURE/TEMPERATURE/TIME DOWN-HOLE RECORDER

[75] Inventor: Oliver W. McCracken, Pauls Valley, Okla.

[73] Assignee: Otis Engineering Corporation, Dallas, Tex.

[21] Appl. No.: 863,678

[22] Filed: Dec. 23, 1977

[51] Int. Cl.² ................. E21B 47/06; G06F 15/20
[52] U.S. Cl. ................................. 364/571; 73/154; 364/112; 364/573
[58] Field of Search .............. 364/111, 112, 422, 571, 364/573; 340/18 R, 18 LD, 18 CM, 18 DC; 324/1; 73/151, 152, 154

[56] References Cited

U.S. PATENT DOCUMENTS

| 3,591,779 | 7/1971 | Sutherland, Jr. ............... 364/112 |
| 3,732,728 | 5/1973 | Fitzpatrick ..................... 73/151 |
| 3,781,869 | 12/1973 | Sudnick et al. ............... 364/571 X |
| 3,790,910 | 2/1974 | McCormack ................... 364/573 X |
| 3,841,152 | 10/1974 | Guest ............................. 73/151 |
| 4,000,643 | 1/1977 | Pearson ........................ 364/571 X |
| 4,033,186 | 7/1977 | Bresie ........................... 73/154 |

Primary Examiner—Jerry Smith
Attorney, Agent, or Firm—Warren H. Kintzinger

[57] ABSTRACT

A down-hole temperature, pressure and time measuring and digital data storage tool, utilizing self-contained microprocessor-based data taking and data reduction, with power conservation realized by processor controlled powering of data transducers only during sample periods and control of the rate at which samples are taken as an inverse function of dynamically calculated data rate of change. Data storage is effected only for data samples representing a significant change in data magnitude as established by a processor program-defined significant-data criteria.

21 Claims, 7 Drawing Figures

MICROPROCESSOR COMPUTERIZED PRESSURE/TEMPERATURE/TIME DOWN-HOLE RECORDER

This invention relates in general to temperature and pressure recording devices and in particular to a battery powered self contained microprocessor based bottom hole recording tool useful in down-hole recording of well bore conditions.

Temperature and pressure readings down-hole in a well bore have long been used to provide useful information in the oil industry. These parameters, along with rate of flow, etc. provide invaluable information about the geological characteristics of the well. Early devices were mechanical and electromechanical in nature, and as such, provided packaging problems. Spring clock driven charts used delicate mechanisms and sensitivity was poor.

With the advent of solid state electronics, reduction in power requirements was significant, and self contained devices employing solid state memory systems were employed as a means of recording down-hole temperature, pressure and time. Devices, as, for example, described in Bresie U.S. Pat. No. 4,033,186, process down-hole gauge signals from plural sensors through a multiplexer and analog-to-digital converter and store binary data in a solid state memory for subsequent read-out upon retrieval of the tool from the well bore.

In Clark et al U.S. Pat. No. 3,977,245, a digital system is employed to convert analog gauge readouts to digital format for storage in memory for subsequent readout.

Systems of the above-referenced type, in employing solid state techniques and employing digital storage, offer a decided improvement over early electromechanical devices, and are capable of reading and storing appreciably more data for a given run because of the appreciable reduction in battery supplied power.

Systems employing such solid state memory systems are, however, essentially a means for efficiently storing temperature and pressure data and time of obtaining raw, uncorrected data. For example, pressure transducers have temperature characteristics which must subsequently be considered and the uncorrected data stored must subsequently be corrected. Analog-to-digital converters employed to process analog readings into binary format for memory storage have zero drift as do temperature and pressure transducers, and these errata must subsequently be considered in processing stored data containing attendant errors into useful, accurate information.

Further, while solid state memory systems are inherently power conservative, as compared to early electromechanical devices, the ultimate utility of such devices may be limited by the memory storage capacity. Known solid state memory systems operate on a predetermined fixed data sampling and storing sequence as defined by clock oscillator countdown dividers. To conserve battery power, the devices are shut down when memory is full, with remaining power utilized to retain stored data in memory. Thus, the length of time for a given data taking run is limited by memory storage capacity and the sampling rate. Under conditions of static pressures and temperatures, memory utilization is inefficiently utilized in recording redundant, like readings.

Still further, systems employing fixed data sampling and storing intervals may fail to accurately record dynamics of the parameters being measured and, while a particular fixed sampling rate may be grossly high for static conditions of measured parameters, the same fixed rate may be grossly inadequate to accurately record rapidly changing parameters.

It is therefore a principle object of this invention to provide a time-referenced down-hole temperature and pressure recording tool employing microprocessor-based programmed data sampling and storage, whereby data is corrected and linearized prior to memory storage.

A further object is to provide a microprocessor controlled data taking and reduction system which calculates significant data change and adjusts sampling rate accordingly, to thereby conserve both battery power and more efficiently utilized memory storage capacity.

A still further object is to provide such a data taking and storing device in which sampling rate is effected by power control to analog transducers and associated analog-to-digital conversion circuitry, with these devices being powered only during the sampling intervals associated therewith.

Still another object is to provide a microprocessor-based measuring and storing device with interchangeable plug-in PROM capability by means of which programming may selectively be altered as to determination of what constitutes significant data changes upon which sampling rate is determined and memory storage decision is predicated for a given run in a given well bore.

Features of this invention useful in accomplishing the above objects include, in a down-hole temperature, pressure and time measuring and digital data storage device, a microprocessor-based data taking and storage device employing time-multiplex data taking of temperature and pressure transducer bridges along with a temperature reference bridge. Data sampling sequences are effected at a rate which varies with the rate of change of the data being sampled by a microprocessor program which, for example, might compare each data sample with the next previous sample, divide the difference by an existing time-out interval, and adjust the program time-out interval for a next successive sample taking program sequence accordingly. The absolute value of changes between successive data samples is compared, by a program defined criteria, to a program defined significant data change reference value, with only those instant samples meeting and exceeding the program defined criteria being stored in memory along with a time tag. Power conservation is attained by controlled power turn-on of transducer and reference bridges during sample times. Microprocessor associated programmable read-only memory devices hold pre-written linearity and temperature correction data unique to each transducer, with the microprocessor program providing data correction prior to storage.

A specific embodiment representing what is presently regarded as the best mode of carrying out the invention is illustrated in the accompanying drawings.

Figure 2:
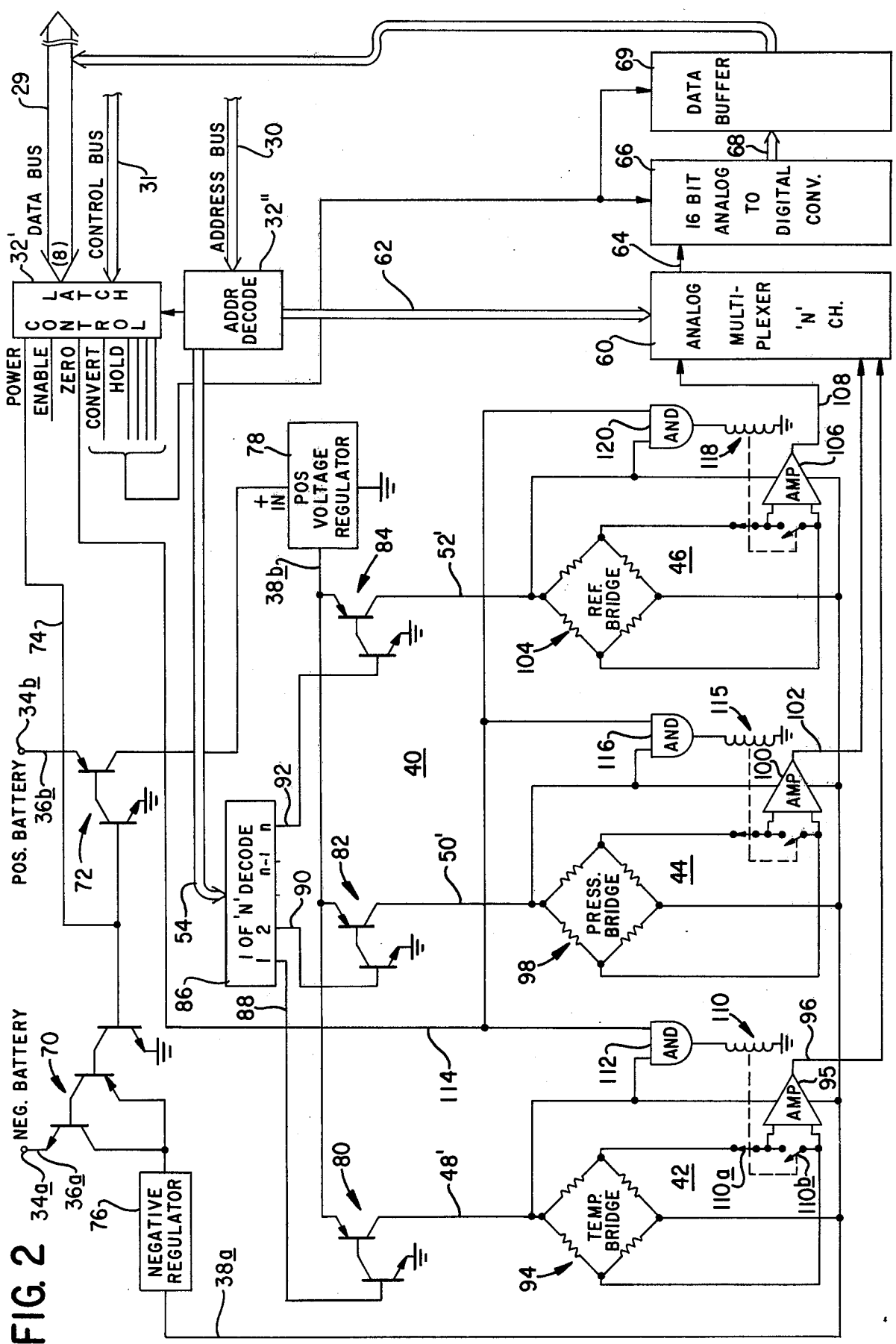
Figure 4:
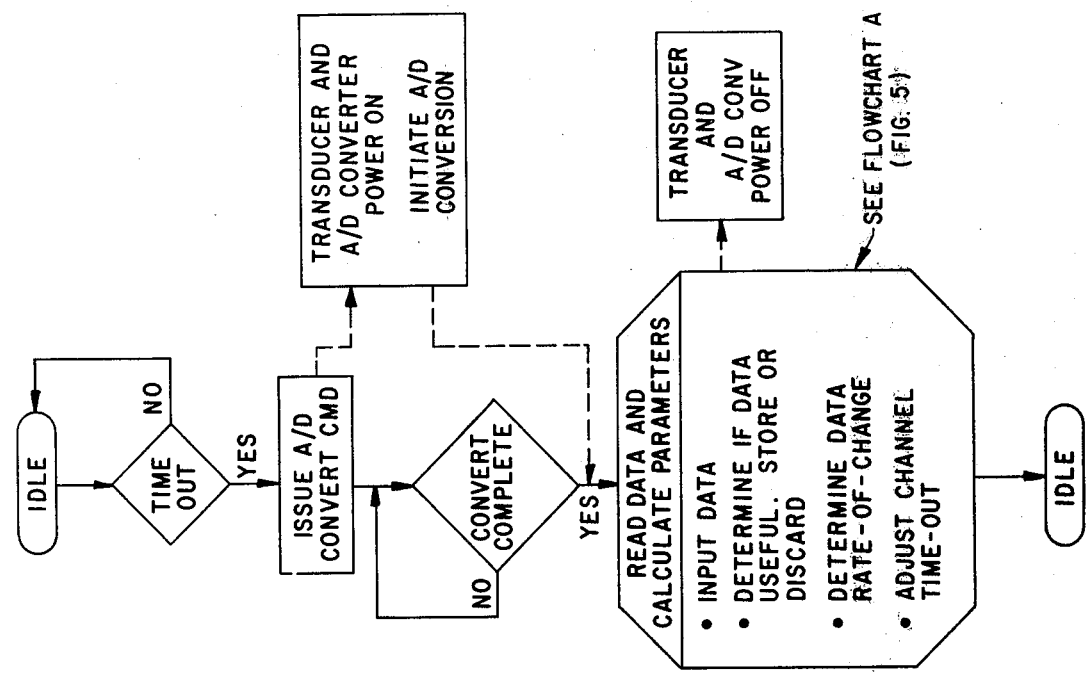
Figure 3:
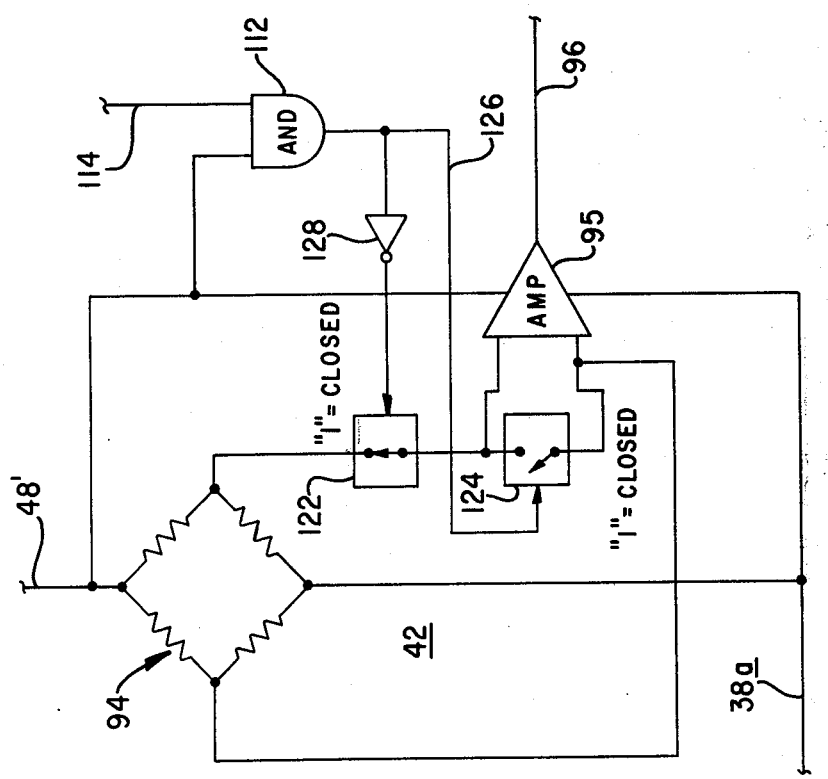
Figure 6:
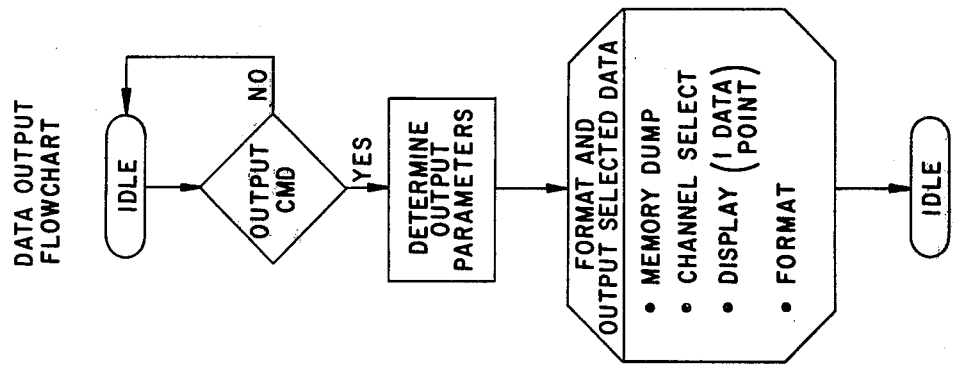
Figure 5:
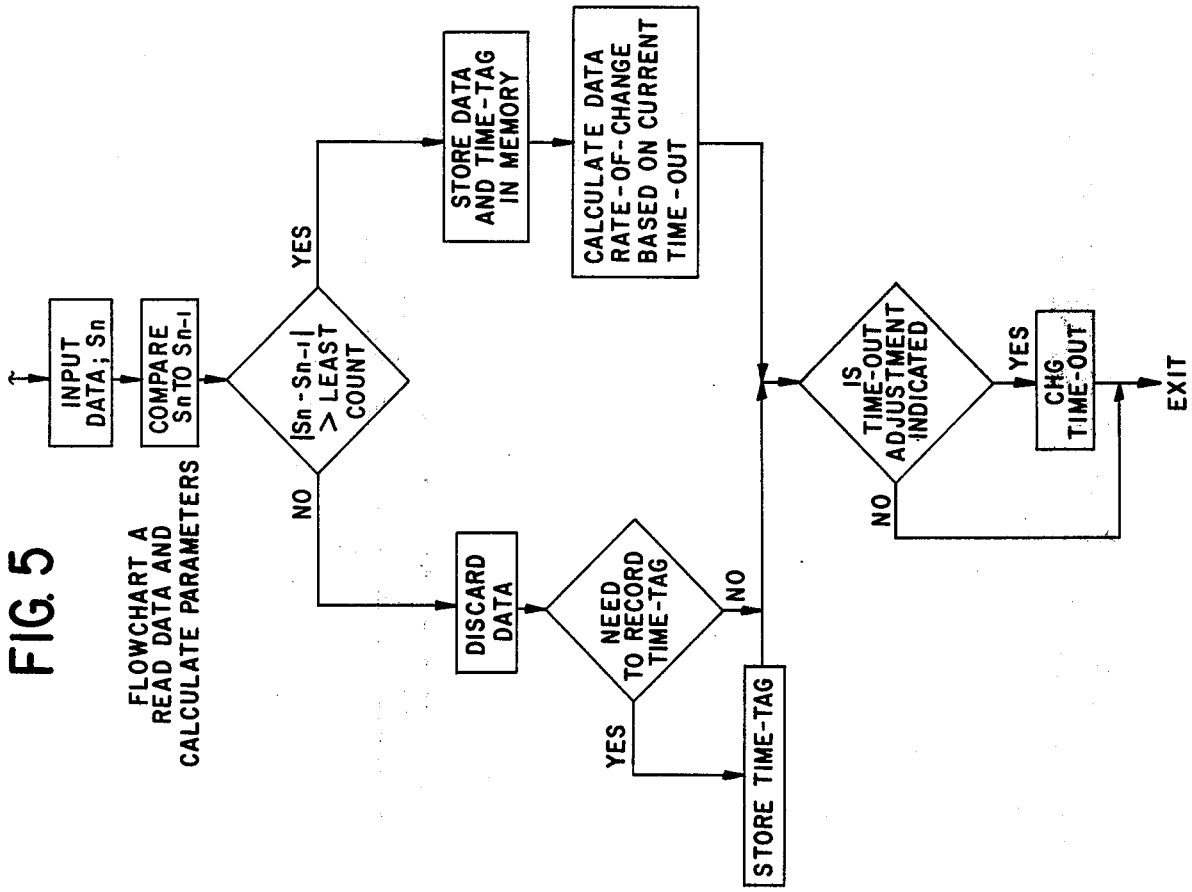
Figure 7:
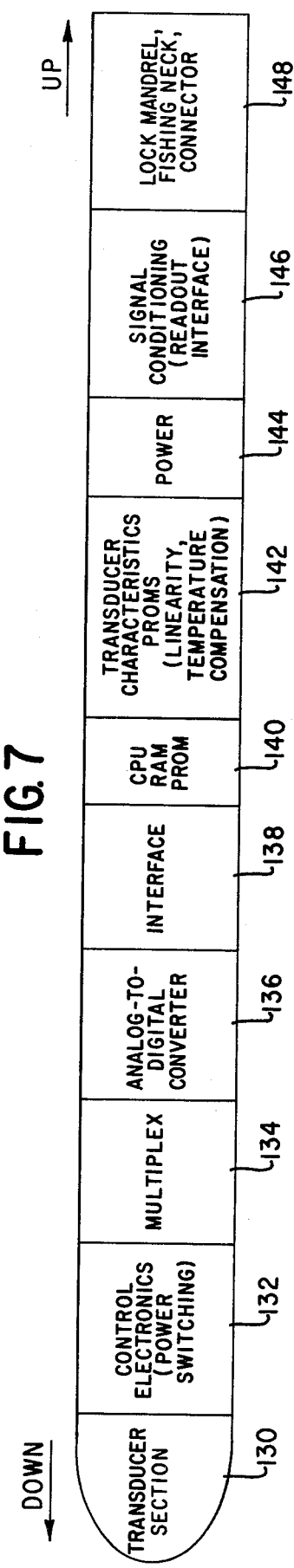

In the drawings:

FIG. 1 represents a functional block diagram of the microprocessor-based down-hole temperature, pressure and time measuring and data storage tool;

FIG. 2, a functional schematic block diagram of the power control interface and transducer portions of the system of FIG. 1;

FIG. 3, an alternative switching arrangement useable in the system of FIG. 2;

FIG. 4, a program flow chart depicting data sampling and channel time-out adjustment;

FIG. 5, a more detailed diagram of the read and calculate block of the flow chart of FIG. 3;

FIG. 6, a program flow chart generally depicting data readout from memory; and;

FIG. 7, a functional physical make-up diagram, a down-hole tool packaging the microprocessor-based temperature, pressure, and time data recorder.

With reference to the functional system diagram of FIG. 1, the recorder of the present invention is shown as comprising a control interface between a data processing and storage system and analog transducers which are sampled by computer activated power control electronics. The upper depicted data processing and storage system 10 comprises a microprocessor including a central processing unit (CPU) 12 along with a random access memory (RAM) 14, programmable read-only memory (PROM) 16, random access memory (RAM) 18, and programmable read-only memories (PROMS) 20, 22, and 24. Also shown is a readout interface unit 26 providing a data readout 27 under control of readout control line 28. RAM 14 interfaces to a common data bus 29, a common address bus 30, and a common control bus 31. PROM 16 interfaces with address bus 30 and control bus 31; and CPU 12, RAM 18, and PROMS 20, 22, and 24 interface with each of the data, address and control buses 29, 30, and 31.

As depicted functionally, RAM 14 is utilized in calculations required by CPU 12; PROM 16 provides program steps of the CPU; RAM 18 provides non-volatile data storage (memory); and PROMS 20, 22 and 24 hold linearity correction data for the respective temperature transducer, pressure transducer, and reference bridge elements of the system.

The above described data processing section is interfaced, through data, address, and control bus interfaces with an interface control 32. Power from battery source 34 is supplied interface control 32 via interconnect 36 and selectively via line 38 to a power control circuitry 40.

Power control circuitry 40, as will be further described, time multiplexes power application to temperature transducer 42, pressure transducer 44 and reference bridge 46 via lines 48, 50, and 52 respectively, under control of a digital multiplexing control line 54 between interface 32 and power control circuitry 40.

When energized upon application of power on line 48, temperature transducer 42 develops a temperature analog output on line 54. Likewise, pressure transducer 44, when supplied power on line 50, develops a pressure analog output on line 56; and reference bridge 46, when supplied power on line 52, develops a bridge reference analog output on line 58. Analog outputs 54, 56, and 58 are applied in time multiplexed sequence to an analog multiplexer 60, which, under control of multiplexing data control input 62 from interface control 32, applies each analog output in sequence on line 64 to analog-to-digital converter 66 to output digital data corresponding to the sampling of the temperature, pressure and bridge references on data line 68 to interface control 32 from which it is applied to the common data bus 29.

Referring now to FIG. 2, wherein certain portions of the interface control and power control circuitries are exampled in more detail, battery source 34 is depicted by negative battery terminal 34a and positive battery terminal 34b. With transistor switches 70 and 72 energized by power on control line 74 from control latch circuitry 32', negative battery power is switched to a negative regulator 76 to provide regulated negative voltage on line 38a; and positive battery power is switched to a positive regulator 78 to provide regulated positive voltage on line 38b. Negative regulated power on line 38a, as will be further described, is connected directly to first power junctions of the bridges associated with temperature transducer 42 and pressure transducer 44, and also to a first power junction of reference transducer 46. As shown in FIG. 2, positive power on line 38b is not applied directly to the other power junctions of the bridges, but is applied selectively through respective bridge associated transistor switches. This selective switching is accomplished in time multiplexed fashion for each bridge output sampling sequence. Power on line 38b is selectively applied through energized switch 80 onto line 48' associated with temperature transducer 42; through energized switch 82 onto line 50' associated with pressure transducer 44; and through energized switch 84 onto line 52' associated with reference transducer 46. Positive regulated power on line 38b is sequentially switched onto lines 48', 50', and 52' under control of respective outputs from a "1 of N" decoder 86 which receives a binary address on line 54 from an address decoder 32". Thus, for example, under control of addresses on common address bus 30 of the microprocessor, a two-bit address may be sequentially incremented to provide sequential switch enabling outputs on output lines 88, 90, and 92 from "1 of N" decoder 86 to sequentially activate transistor switches 80, 82, and 84, and thus sequentially apply positive power on lines 48', 50' and 52'.

With power on line 48', temperature bridge 94 of transducer 42, as well as amplifier 95 to which the output from bridge 94 is applied, are operated to develop an amplifier output 96 which is a voltage analog of temperature. Likewise, with power on line 50'; pressure bridge 98 of transducer 44, as well as amplifier 100 to which the output from bridge 98 is applied, are operable to develop an output 102 from amplifier 100 which is a voltage analog of pressure. Reference bridge 104 and its associated amplifier 106 are operable upon power applied to line 52' to develop an amplifier output 108 which is a voltage analog of the temperature drift of pressure transducer 44; reference bridge 104 being a bridge identical with bridge 98 of pressure transducer 44, but not subjected to ambient pressure.

Analog outputs from each of the pressure and temperature transducers, and from the reference bridge, are applied as respective separate inputs to analog multiplexer 60, which, under control of incremented binary addresses on line 62 from address decoder 32", sequentially applies analog outputs from the bridges, as they are developed through power-on activity, onto multiplexer output line 64 for application to analog-to-digital converter 66. Digital outputs on converter 66 output line 68 are thus sequentially applied, via data buffer 69, to the microprocessor common data bus 29 for processing and storage in memory.

Associated with each of the temperature and pressure transducers, and the reference bridge, is an auto-zeroing feature by means of which zero offset for the bridge output amplifiers may be determined, which offset may be obtained and stored by the computer for program-defined correction of the samples received during the repeated sampling sequences. Referring to FIG. 2, a relay 110 and associated contact pairs 110a and 110b is shown in relaxed (unenergized) state with contact pair 110a closed to apply the output from bridge 94 to amplifier 95. Relay contact pair 110b, which shunts the amplifier input terminals, is open in the depicted relaxed state. This depicted state is maintained (relay 110 drawing no power) under normal operating conditions. Output 96 from amplifier 95 may be offset, i.e., experience zero state drift under changing ambient temperature, and this offset must be ascertained in order that the processor may correct the transducer output sample. For this purpose, relay 110 may be periodically energized, as defined by computer programming, to open up the bridge output as applied to amplifier 95, and short the input terminals of amplifier 95, with any then-experienced amplifier output defining a then-existing offset error in samples of the temperature transducer output. Relay 110 is selectively energized by the output from AND gate 112. Inputs to AND gate 112 comprise the positive power on bridge input line 48' and an enabling output 114 which may be selectively caused to appear from control latch 32' such that a "zero" command on line 114 during any time interval when power is switched onto line 48' to energize bridge 94, will cause relay 110 to operate for determination of zero offset via any output from amplifier 95. Relay 115, associated with pressure transducer 44, is similarly energized by AND gate 116 via power switched onto bridge input line 50' and an enabling signal on line 114. Relay 118 and AND gate 120, associated with reference bridge transducer 46, likewise provide for a zero offset determination for the reference bridge output from amplifier 106.

Zero offset from all three depicted bridge amplifiers may then be selectively determined by computer program command for subsequent utilization in the processor program in correcting subsequently taken data samples from the bridges.

The above-described auto-zeroing feature, embodies relay operated switch contacts to effect the offset determination. Mechanical switch contacts offer the advantage of precluding the switch elements themselves from introducing offset error. The relays 110, 115, and 118 embodied in FIG. 2 offer this advantage, and commercially available low power consumption relays contemplated for useage in FIG. 2 would not introduce sufficient battery power drain to be inconsistent with the power conservation aspect of the recorder. Alternatively, as functionally shown in FIG. 3, the switching functions provided by the relays of FIG. 2 may be accomplished by solid state switching means. Referring to FIG. 3, a solid state switching arrangement is depicted for temperature transducer 42 as being typical of that which might be associated with each of the bridges in FIG. 2. Solid state switching means 122 may replace the relay contact-pair 110a associated with the temperature transducer 42, and solid state switching means 124 may replace the relay contact-pair 110b associated with transducer 42. Each of switches 122 and 124 might comprise a switching element which is energized in response to a logic "1" input. In the depicted relaxed state, AND gate 112 produces a logic "0" output (enabling input on line 114 not present). The logic "0" output 126 from AND gate 112 is applied through inverter 128 as an energizing input to solid state switch 122 and thus closes the bridge output line to amplifier 95, while the AND gate "0" output level applied directly to solid state switch 124 does not energize switch 124. With an enabling logic "1" level on input line 114, and power applied on line 48', AND gate provides a logic "1" output which deactivates switch 122 and activates switch 124 to thereby open the bridge output line and short the input to amplifier 95. It should be noted that use of solid state switching may introduce switch-associated offsets which, unless recognized, may themselves produce offset and drift errors in the data sample outputted by the transducer amplifier. For this reason, the relay switch implementation, in offering mechanical contacts, might be considered preferable and more than compensative for any attendant increased power drain over solid state switching.

The system, as described above, is seen to provide interface with a microprocessor by responding to processor generated control signals to produce digital data sample readouts of pressure, temperature and reference bridges in repeated time multiplexed sequences. Provision for bridge offset determination has been described, such that data is presented the microprocessor which may permit the processor to correct the data samples prior to storage. Power conservation techniques have been described whereby the bridge outputs are sampled by controlled application of power thereto, and thereby powered only during sampling periods. Consistent with power conservation, is the feature of having a variable sample rate of the measured variables in the well, where, under relatively static conditions of measured parameters, the sampling rate is low and under rapidly changing state; the sample rate is high. This feature, along with the storage in memory of significant data only, results in maximized useage of memory storage capability as well as power conservation.

In accordance with the present invention, the power conservation and efficient memory utilization features may be implemented by appropriate programming of the tool microprocessor. Unique data reduction, and sample rate adaption to measured parameter change rate, may be implemented by microprocessor programming.

The data reduction capability of the microprocessor-based tool herein described would allow the calibration curve and temperature correction curve for the temperature and pressure transducers and reference bridge to be put into a nonerasable PROM before the tool is run (see PROMS 20, 22 and 24 of FIG. 1). The microprocessor, via state of the art programming techniques, may then use the information stored in these PROMS to linearize and correct the data taken from the transducers and bridges before it is entered into the memory of the tool.

The contemplated variable sample rate feature may be accomplished by a sub routine in the processor program that causes the sample rate to vary, for example, with the changing rate of pressure samples. This routine, as exampled by the flow chart of FIG. 4, initiates with a time-out interval, effects a sequence of time-multiplexed power application to each of the transducers and reference bridge, inputs data to the CPU, calculates data rate of change for subsequent time-out adjustment, and makes a determination of whether an instant sample constitutes a significant data change which should be stored in memory.

FIG. 5 shows a flow-chart definitive of the "read data and calculate parameters" block of FIG. 4, where input data sample $S_n$, for example, a pressure sample, is compared to the next previously taken sample $S_{n-1}$. If the absolute value of $S_n - S_{n-1}$ is greater than a predetermined least count, $S_n$ is stored with time tag in memory, whereupon data rate of change may be calculated by division of $S_n - S_{n-1}$ by the current time-out, and a subsequent time-out adjustment mode, based upon a programmed criteria. The flow chart further depicts provision for discard of insignificant data which does not represent sufficient change to meet the least count criteria, along with provision for storing a confidence time-tag should, for example, some preselected number of sample periods occur without data samples meeting the least-count criteria. Time-out may then be, according to a program defined algorithim, adjusted as a selected function of data sample rate of change. With slowly varying sample change rate, time-out may be increased, while with increasing sample change rates, the time-out may be decreased accordingly, thus effectively changing the rate at which the routine of FIGS. 4–5 is performed and thereby adapting the rate of sampling to the dynamics of the measured variable.

Data written into memory (RAM data storage 18 of FIG. 1) would contain a pressure reading, a temperature reading, and a time reading. As above discussed, the memory entries would be minimized by varying the sample rate, and by noting significant changes in measured variables as a criteria for writing into memory.

Upon retrieval of the tool from a well bore upon completion of run, surface equipment of commercially purchased type may be used to decode the memory of the down-hole recording tool. For this purpose, FIG. 1 generally depicts a readout interface 26 communicating with the data and address busses, along with a readout control line 28 and data output bus 27. Readout might be applied to a minicomputer or microcomputer programmed to reconstruct the pressure versus time and temperature versus time data that existed in the well during the time that the down-hole tool was in place. It may be appreciated that the entire characteristic of the well is not stored in the tool memory, rather an abbreviation of the characteristic is stored, due to the significant data criteria imposed on data storage. The stored data does include time keeping however, such that the running pressure versus time and temperature versus time characteristics may be reconstructed such that they can be displayed, printed or plotted. An exampled data output flow chart is shown in FIG. 6. Any number of output formats might be employed to retrieve the stored data in the tool upon completion of a down-hole run.

FIG. 7 functionally depicts a mechanical configuration of the tool herein described as it might be packaged in, for example, a 1.5 inch diameter housing, with down-hole end packaging a transducer section 130 followed successively by power switching section 132, multiplex section 134, analog-to-digital converter section 136, interface section 138, CPU, RAM and PROM section 140, transducer characteristics PROM section 142, power section 144, readout interface section 146, and upper end lock mandrel, fishing neck and connector 148.

Whereas this invention is herein illustrated and described with respect to a particular embodiment thereof, it should be realized that various changes may be made without departing from essential contributions to the art made by the teachings hereof.

I claim:

1. The method of storing data versus time down-hole in a well bore from a self-contained tool comprising temperature and pressure transducers, a pressure transducer reference bridge, a power source, and an associated microprocessor computer; comprising the steps of:

(1) initiating a preselected program-defined initial time-out period, (2) upon completion of said preselected initial time-out period, initiating via said microprocessor, a time-multiplexed analog read-out sample of each of said transducers and reference bridge, (3) converting each said analog output sample to a digital format and storing same in a register of said microprocessor, (4) determining the differential between each instant stored sample and the next preceding like sample and storing those instant samples effecting a differential with absolute value exceeding a least count value in RAM storage means, (5) storing a time tag associated with each sample stored in step (4), (6) computing the data rate of change from successive pairs of samples, (7) adjusting a next successive time-out period as an inverse function of each next preceding data rate of change computation; and (8) repeating steps (2) through (7), above.

2. The method of claim 1, with step (4) comprising the sequential steps of:

(4a) computing from each pressure transducer sample and the associated multiplexed sample output of said reference bridge, a temperature corrected value of said pressure transducer sample, (4b) storing said temperature corrected sample in said RAM storage means of said microprocessor.

3. The method of claim 2, with said time multiplexed samples being effected by a computer interfaced power control, with said transducers and reference bridge being sequentially powered by said power source to effect each said time multiplexed sampling sequence.

4. The method of claim 3, with said microprocessor computer comprising programmable read only memory means storing calibration and temperature correcting defining data for each of said transducers and said bridge, and comprising the additional sub-step in step (4) of using said microprocessor to linearize and temperature correct said data samples taken from said transducers and bridges prior to being stored in said computer RAM storage means.

5. The method of claim 4, with step (5) comprising the sub-step of storing a confidence time tag in said RAM storage means after a predetermined number of successive data samples fail to meet the criteria defined by step (4).

6. In a down-hole measured parameter recorder of the type employing analog-to-digital conversion of analog signal outputs from periodically sampled transducers and subsequent storage of digital data in solid state memory; first comparing means for comparing each transducer output sample with a next previously stored sample, second comparing means for comparing the absolute value of the output from said first comparing means with a reference value, and control means, responsive to the output of said second comparing means, to effect writing into memory only those samples having magnitudes at least as great as said reference value.

7. The recorder of claim 6, with computer means for calculating from successive sample pairs, and the lapsed time therebetween, the rate of change of the sampled parameter, and further control means responsive to said calculated rate of change to alter the sample periodicy as a direct function of said rate of change.

8. The recorder of claim 7, with control means selectively applying power to said transducers and analog to digital conversion means only during the sample time period.

9. The recorder of claim 8, with one of said transducers comprising a pressure sensitive bridge and with a reference bridge means like that of said pressure transducer and not subjected to ambient pressure, said reference bridge means being sampled with said pressure transducer bridge output, and means responsive to said reference bridge samples to remove temperature drift from said pressure samples prior to storage in said memory.

10. The recorder of claim 9, with programmable read-only memory means storing calibration characteristics of each said transducer over the range of parameter to be measured, and with said computer means being programmed to utilize said stored calibration characteristics to linearize sampled data prior to storage thereof.

11. The recorder of claim 10, with said computer means being programmed to effect an initial time-out period of selected duration prior to effecting a first sample taking sequence and to adjust the time-out period prior to each of successive sample taking sequences as an inverse function of the rate of change of magnitude of a next preceding pair of successive samples.

12. In a temperature, pressure and time recorder instrument, including storage means for storing periodically-taken samples of pressure and temperature; means responsive to said samples to calculate the rate of change of magnitude thereof, and means responsive to the absolute value of said calculated rate of change to alter the rate at which samples are taken as a direct function of said rate of change of magnitude.

13. The instrument of claim 12, with means differentially comparing an instant sample with a next previously taken sample, and means responsive to the differential between successive sample-pairs exceeding a reference value to effect storage of said instant sample.

14. The instrument of claim 13, with time recording means effecting a storage of time at which all stored samples are taken.

15. The instrument of claim 14, with said time recording means further effecting a storage of time at periodic intervals defined by a predetermined number of successive samples, as differentially compared with next preceding samples, defining a differential not exceeding said reference value.

16. In a variable parameter timing recorder instrument, including storage means for storing periodically-taken samples of at least one variable parameter; means responsive to said samples to calculate the rate of change of magnitude thereof, and means responsive to the absolute value of said calculated rate of change to alter the rate at which samples are taken as a function of said rate of change of magnitude.

17. The instrument of claim 16, in the form of a downhole in a well bore electric powered tool with means differentially comparing an instant sample with a next previously taken sample, and means responsive to the differential between successive sample-pairs exceeding a reference value to effect storage of said instant sample.

18. The instrument of claim 17, with time recording means effecting a storage of time at which all stored samples are taken.

19. The instrument of claim 18, with said time recording means further effecting a storage of time at periodic intervals defined by a predetermined number of successive samples, as differentially compared with next preceding samples, defining a differential not exceeding said reference value.

20. The method of storing data versus time downhole in a well bore from a self-contained tool comprising parameter sensing transducer means, a power source, and an associated microprocessor computer; comprising the steps of:
   (1) initiating via said microprocessor, an analog readout sample of said transducer means,
   (2) converting each said analog output sample to a digital format and storing same in a register of said microprocessor,
   (3) determining the differential between each instant stored sample and the next preceding sample and storing those instant samples effecting a differential with absolute value exceeding a least count value in RAM storage means,
   (4) storing a time tag associated with each sample stored in step (3),
   (5) computing the data rate of change from said samples,
   (6) adjusting the rate of taking said samples as a direct function of said data rate of change; and
   (7) repeating steps (1) through (6), above.

21. The method of claim 20, with said samples being effected by a computer interfaced power control, with said transducer means being powered by said power source to effect each said sampling.

* * * * *